United States Patent Office 3,345,350
Patented Oct. 3, 1967

3,345,350
POLYMERIZATION OF ACRYLONITRILE
Nehemia Shavit, Rupin St., Rehovoth, Israel; Mordekhai Konigsbuch, Shikum Hapoel Hamizrachi, Kfar Saba, Israel; and Avraham Oplatka, 34 Palmach St., Givataim, Israel
No Drawing. Filed Nov. 29, 1963, Ser. No. 327,091
10 Claims. (Cl. 260—85.5)

This application is a continuation-in-part of copending application Ser. No. 138,000, filed Sept. 14, 1961, and now abandoned.

This invention relates to a process for polymerization of acrylonitrile and to acrylonitrile polymers produced thereby. More particularly, the invention relates to a process for the polymerization of acrylonitrile in bulk designed to produce solid, transparent or crystal clear, substantially water-white and substantially solvent-free acrylonitrile polymers.

In the following specification all parts and percentages are given by weight unless otherwise indicated.

Monomeric acrylonitrile has been polymerized, according to the prior art, in a substantial number of different systems including aqueous systems, organic solvent systems and bulk systems. Frequently, polymeric acrylonitrile, especially when prepared from an aqueous system and extracted from the aqueous medium, is a dry, powdery material which to the human eye is substantially opaque. These exceedingly small particles, however, can be molded into large objects by known methods, employing very high pressures and high temperatures. The molded objects resulting therefrom are frequently degraded somewhat in their properties because of the extreme temperatures and pressures used to consolidate the small polymeric particles into a larger polymeric mass. This degradation readily reflects itself in the appearance of the article.

If one produces an object by these prior art extreme conditions, the opacity of the object may be diminished and the translucency enhanced somewhat but a certain measure of undesirable discoloration necessarily reflects the degradation that the polymer has undergone, resulting in an article with yellowish to brownish to black coloration which does not have the same desirability that a crystal clear, transparent, solid, water-white polymer of acrylonitrile would have.

Again, according to the prior art, one may dissolve these small, opaque polyacrylonitrile particles in a suitable solvent such as dimethyl formamide and, if a film is drawn down therefrom on a substrate, followed by baking, a comparatively clear, transparent film results; the polymeric film thus produced nevertheless contains amounts of undesirable entrapped solvent. The entrapped solvent can be completely removed from such films only with the greatest of difficulty. The removal is accomplished to a considerable extent by baking at elevated temperatures for rather prolonged periods of time. This prolonged baking again results in a degradation of the polymer, resulting in yellowish, brownish or black films. Removal of the solvent from large or thick cast bodies is virtually impossible.

It has in fact been concluded that the production of clear castings of acrylonitrile polymers is impossible (see "Polymer Processes," Schildknecht, Interscience (1956)).

It is accordingly among the objects of the present invention to provide substantially transparent polymers of acrylonitrile.

A further object of the invention is to provide a process for polymerizing acrylonitrile in bulk, to produce such a polymer.

An additional object is to provide novel polymerization initiators and color stabilizers which may be utilized in such process and which also find general application in catalyzing the polymerization of acrylonitrile and stabilizing the color of the resulting acrylonitrile polymer against degradation from exposure to light.

These and other objects of the present invention will be discussed in greater detail hereinbelow.

In accordance with the present invention a process is provided for polymerizing acrylonitrile in bulk at relatively mild temperatures, e.g., temperatures between about 0° C. and 60° C., which results in the production of a solid, substantially transparent, water-white and solvent-free polymer of acrylonitrile. This result is achieved by carrying out the polymerization in bulk in the presence of an acrylonitrile polymerization initiator while maintaining the reaction mass, in the later stages of the polymerization at least, free from substantial mechanical agitation and providing, at the same time, a surface layer of monomeric acrylonitrile at the interface between the polymerizing mass and the surrounding atmosphere. The monomeric surface layer contains acrylonitrile in an amount sufficient to be available for entry into the polymerizing mass so as to prevent the development of any significant voids therein, and facilitates continuing the reaction until the desired solid, substantially transparent polymer of acrylonitrile is produced.

The substantially transparent polymerization product thus produced has a high softening point, good solvent and scratch resistance, and possesses desirable hardness and toughness characteristics. It may be used, for example, for constructing optical elements and may be so employed in either a practically colorless form or in the form of a colored transparent body. Polymerization products prepared in accordance with the invention can also be utilized in the electrical industry for insulation and other purposes.

An essential feature of the present invention involves maintaining the polymerizing mixture, in the later stages of the polymerization at least, substantially free from mechanical agitation while simultaneously providing the aforesaid monomeric acrylonitrile-containing surface layer at the interface between the polymerizing mass and the surrounding atmosphere. In the initial stages of the polymerization when, for example, the monomeric acrylonitrile and a polymerization initiator are mixed together, a certain amount of agitation is necessary or at least desirable in order to provide a substantially uniform distribution of the initiator in the liquid monomer. As the polymerization proceeds, and particularly when the mass begins to solidify, the polymerizing body should not be agitated, either internally or externally.

Mechanical agitation of the polymerizing mixture may introduce air between the particles of the polymerizing mass, the air inhibiting further polymerization thereof and producing clouded or opaque areas in the polymerizate. Moreover, mechanical agitation or disturbance of the polymerizing mass during the later stages of curing thereof may result in a momentary rupture of the monomeric surface layer maintained thereon, preventing the acrylonitrile monomer in the surface layer from entering into the interstices between the individual polymer particles and leaving voids in the polymeric mass. The resulting discontinuous polymer would possess areas having different refractive indices, thereby introducing cloudiness or opacity in the product.

Hence, by maintaining the polymeric mass substantially free from mechanical agitation and simultaneously establishing the aforesaid acrylonitrile monomer-containing surface layer at the interface between such mass and the atmosphere, at least during solidification of the reaction mass, air cannot enter the polymerizing mass to inhibit polymerization and voids are prevented, thereby insuring the production of a continuous, substantially homogeneous polymeric product having a uniform index of refraction. It will, of course, be understood that the preceding description of the mechanism by which opacity of the acrylonitrile polymers produced in accordance with the invention is avoided, is intended as explanatory only and is not limiting of the scope of the invention.

The monomeric surface layer maintained at the interface between the polymerizing mass and the surrounding atmosphere can be of any suitable thickness, depending almost entirely upon the size of the operation itself. If small objects are to be produced, the monomeric layer need only be of minimal thickness, e.g., about one millimeter in depth. However, if the object to be produced is of significant dimensions, a surface layer having a greater thickness and volume will be required. It suffices if sufficient acrylonitrile is present to prevent the development of any significant voids in the polymerizing mass.

The surface layer contains acrylonitrile monomer and, desirably, a polymerization initiator, in order that when and as the monomer is withdrawn from the surface layer into the polymerizing mass it, too, can undergo polymerization in situ, thereby preventing the development of voids. The catalyzed acrylonitrile in the monomeric layer is, however, controlled, so as to inhibit polymerization prematurely and before the monomer is drawn into the polymerization mass. This can be effected by use of any known inhibitor, e.g., air.

The surface layer may also contain quantities of comonomers, plasticizers, fillers, reinforcing materials, coloring materials, surfactants, salts and oxides of metals or other materials which may, either singly or in admixture, be incorporated in the polymerizing mixture.

The monomeric acrylonitrile-containing surface layer may be provided by the continuous or intermittent addition of monomer during the polymerization, as by contacting the polymeric mass with a reservoir having direct liquid contact therewith. Alternatively, the monomeric layer may be maintained by establishing a temperature gradient between the strata of the polymerizing mass or by so establishing the polymerization reaction rate as to permit the precipitation of the acrylonitrile polymer as formed to the lower layers of the reacting mass.

As noted hereinabove, the polymerizing mass may include any of the additives commonly employed in the plastic art. Hence, while the process of the present invention is directed primarily to the homopolymerization of acrylonitrile it is also applicable to copolymerization of acrylonitrile with one or more different polymerizable comonomers wherein the acrylonitrile is present in the major proportion, i.e., in an amount approximating at least about 85% of the total weight of polymerizable monomers present in the system.

The remaining 0–15% polymerizable monomers, other than acrylonitrile, which may be used in copolymerization therewith are any one of the polymerizable compounds containing the polymerizable $CH_2=C<$ group which have boiling points above 60° C. and which are normally liquid under the conditions of the process. Among these polymerizable monomers are the styrenes such as styrene per se or ring- or side chain-substituted alkyl or halo styrenes, such as o-, m-, or p-methyl styrene, 2,4-dimethyl styrene, o-, m-, p-chlorostyrene, divinyl benzene and the like, or the acrylates such as methyl acrylate, ethyl acrylate, propyl acrylate, butyl acrylate, methyl methacrylate, ethyl methacrylate, glycol dimethacrylate and the like. Additionally, one could make use of other acrylic comonomers including methacrylonitrile, acrylic acid, methacrylic acid, ethacrylic acid and the like or acrylamide, methacrylamide, methylene, bisacrylamide and the like. If desired, polymerizable allyl monomers may be used, such as diallyl phthalate, diallyl maleate, allyl methacrylate and the like. These polymerizable monomers may be used either singly or in combination with one another in the copolymerization of the acrylonitrile, but whether used singly or in combination, the total amount of the additional monomers used should not exceed about 15%.

Any acrylonitrile polymerization initiator may be utilized in the present process, of which a substantial number are well known in the art. Hence, any of the known free radical forming catalysts such as hydrogen peroxide, benzoyl peroxide, cumene hydroperoxide, tertiary butyl hydroperoxide, ditertiary butyl peroxide, t-butylperoxypivalate, lauroyl peroxide, or acetyl peroxide; azo-bis-isobutyronitrile; p-toluene sulfinic acid; or the like, may be employed herein. These initiators are utilized in conventional catalytic quantities, e.g., from about 0.01% to about 5% by weight, based on the total weight of the monomer or monomers to be polymerized. Amounts exceeding 5% could be used but are frequently unnecessary and may impart coloration to the acrylonitrile polymer produced, which may in some instances be undesirable.

Ionizing radiation such as gamma radiation, or visible or ultraviolet light may also be used as initiators.

It has also been discovered, in accordance with the present invention, that the substantially transparent acrylonitrile polymer can be produced employing certain novel polymerization initiator systems. Such initiators may be used to catalyze the homo- or copolymerization or acrylonitrile according to the bulk procedure described herein, or may be so employed in aqueous or organic solvent media as well.

The preferred novel initiator systems comprise mixtures of p-toluene-sulfinic acid and p-toluene-sulfonic acid; p-toluene-sulfinic acid and azo-bis-isobutyronitrile; p-toluene-sulfinic acid and hydrogen peroxide; p-toluene-sulfinic acid, p-toluene-sulfonic acid and hydrogen peroxide; benzene sulfinic acid and hydrogen peroxide; and azo-bis-isobutyronitrile and hydrogen peroxide. These initiators may be used, as described above, in conventional quantities ranging from about 0.01% to 5% by weight, the optimum concentration depending on the specific initiator system utilized, the reaction temperature and the volume and shape of the reaction system. Desirably, the initiator compositions are constituted of mixtures of from about 0.1% to 5% p-toluene-sulfinic acid admixed with up to about 5% p-toluene-sulfonic acid; from about 0.1 to 5% p-toluene-sulfinic acid admixed with from about 0.5 to 5% azo-bis-isobutyronitrile; from about 0.05 to 7% p-toluene-sulfinic acid admixed with up to about 2.5% hydrogen peroxide; from about 0.1 to 5% p-toluene-sulfinic acid admixed with from about 0.1 to 5% p-toluene-sulfonic acid and up to about 3% hydrogen peroxide; from about 0.1% to 5% benzene sulfinic acid admixed with from about 0.05 to 3% hydrogen peroxide; and from about 0.05 to 5% azo-bis-isobutyronitrile admixed with from about 0.05 to 2% hydrogen peroxide, each of the preceding percentages based on the quantity of total monomer to be polymerized.

It will, as noted above, be understood that the optimum concentrations will depend upon the parameters of the reaction system; hence, when an initiator system constituted of p-toluene-sulfinic acid and hydrogen peroxide is utilized to catalyze the polymerization of acrylonitrile at 20° C. in a Pyrex test tube of 13 mm. internal diameter, employing 3 ml. acrylonitrile, the optimum concentration range varies from about 0.4 to 1.2% p-toluene-sulfinic acid admixed with up to about 0.8% hydrogen peroxide.

Additionally, various metal salts have been found which act to catalyze the polymerization of acrylonitrile, including mercuric bromide, mercuric chloride, mercuric iodide, mercuric nitrate, mercuric acetate, mercuric sulfate, mercuric bromate, mercurous nitrate, mercurous acetate, mercurous sulfate, cupric nitrate, aluminum nitrate, cadmium nitrate, nickelous nitrate, magnesium nitrate, chromic nitrate, ferrous perchlorate, calcium perchlorate and uranyl nitrate. It is believed that the catalytic action of the metal salts is due, in some way, to the formation of complexes with the olefinic bond of the acrylonitrile monomer and the nitrile group thereof.

The concentration of the metal salt initiator employed depends upon the several factors discussed hereinabove. It is preferred, however, to employ the metal salts, alone or in admixture, in amounts of from about 1 to 20%, or in admixture with one or more of the free radical forming catalysts or preferred initiator systems described above, in the amounts of from about 1 to 5% of the metal salt and from about 0.1 to 5% of the supplemental initiator, based on the weight of the monomer(s) to be polymerized.

The substantially transparent, water-white acrylonitrile polymers produced in accordance herewith tend to discolor, turning yellow over a period of time. Various known color stabilizers have been found to either fail to inhibit yellowing of such polymers or to prevent the formation of the transparent polymeric products; included among such unsatisfactory color stabilizers are isobutyronitrile, β-methoxypropionitrile, acetonitrile, butylcarbamate, ethyl-N-phenylcarbamate, adiponitrile, phenylacetonitrile, ethylcarbamate, n-tributylamine, ethyl thioglycolate, aluminum nitrate and magnesium nitrate.

It has been discovered, in accordance with a further feature of the invention, that the bulk polymerization of acrylonitrile may be carried out in the presence of certain alkylaminopropionitrile color stabilizers which substantially inhibit discoloration of the transparent polymeric products. The alkylaminopropionitriles, e.g., β-dimethylaminopropionitrile and preferably β-isopropylaminopropionitrile, have been found to stabilize the color of the transparent acrylonitrile polymers when used in relatively small percentages ranging from about 0.1% to 0.3% by weight of the monomeric material polymerized. When greater percentages of the color stabilizer are employed the formation of the transparent acrylonitrile polymer is somewhat inhibited.

The percentage of the alkyl aminopropionitrile color stabilizer incorporated in the bulk polymerization mixture depends, inter alia, upon the composition of the initiator system utilized and the temperature of the reaction mixture. Employing an initiator system constituted of 1% p-toluene-sulfinic acid and ½% hydrogen peroxide and maintaining the polymerizing mixture at a temperature of about 20° C. it is preferable to employ from about 0.2% to 0.25%, by weight of the monomer, of the β-dimethylaminopropionitrile or from about 0.25% to 0.35%, by weight of the monomer, of the β-isopropylaminopropionitrile stabilizer. Employing the same initiator system but using lower reaction temperatures, it is preferred to employ lower proportions of the stabilizers, whereas at higher reaction temperatures greater proportions of the stabilizers are desirable.

The polymerization mass may additionally include, as noted above, suitable quantities of plasticizers, fillers, reinforcing materials, coloring materials, surfactants, salts and oxides of metals, or like additives known in the plastic art.

The bulk polymerization process of the present invention is carried out by effecting a comparatively slow polymerization of the acrylonitrile monomer, which may be admixed with the various additives described hereinabove at a temperature adapted to prevent a run-away reaction, preferably from about 0° C. to 60° C. It is ordinarily preferable to carry out the reaction under atmospheric pressure but, in certain circumstances, superatmospheric pressures, e.g., pressures of 5, 10 or 20 atmospheres may be utilized. When such superatmospheric pressures are employed the temperature of the polymerization reaction mixture may be permitted to exceed 60° C. and the reaction may be carried out at temperatures of 70° C., 80° C., or 90° C., for example.

It is thus possible to obtain cast bodies of any predetermined shape, since the solid acrylonitrile polymers produced by the process hereof are of shapes conforming to the shapes of the forms in which they are cast, no appreciable shrinking taking place during curing to the hard, solid polymerization products. Hence the acrylonitrile polymers may be cast in the shape of sheets or other desirable forms, or alternatively, the hard and rigid cast bodies obtained may be shaped on a lathe or machined by other means.

In order that the concept of the present invention may be more completely understood the following examples are set forth. These examples are shown primarily by way of illustration and any specific enumeration of detail contained therein should not be interpreted as a limitation on the case except as is indicated in the appended claims.

EXAMPLE 1

2.0 ml. of acrylonitrile were agitated with 200 mg. of mercuric nitrate in a test tube. After a short induction period, a white powdery substance began to precipitate. A 1 mm. layer of monomeric acrylonitrile was maintained above the poylmerizing mass. After standing at a temperature of about 35° C., with free access to the air, for 10 days most of the polymer initially precipitated was converted into a hard, solid and transparent form, having the exact dimensions of the test tube in contact therewith.

The transparent polymeric form obtained was easily cut into small transparent disks on a lathe.

EXAMPLE 2

7.0 ml. of acrylonitrile were mixed with 500 mg. of mercurous nitrate and introduced into a small test-tube. A 2.5 mm. layer of monomeric acrylonitrile was maintained above the polymerizing mass. The test-tube was maintained at a temperature of 25° C. for 20 days. During this period, part of the powdery polymeric material formed initially was converted into a transparent polymer of yellowish color, whereas another part formed an opaque hard polymer.

EXAMPLE 3

4.0 ml. of acrylonitrile were mixed with 500 mg. cupric nitrate and introduced into a test-tube of 8 ml. volume. A 1.5 mm. surface layer of monomeric acrylonitrile was placed over the polymerizing mass. The test-tube was introduced into a larger vessel, which was opened every day in order to facilitate air access thereto. After about 6 days the initially precipitated white, powdery polymeric mass had changed to a rigid, greenish, hard and translucent polymer.

EXAMPLE 4

4.0 ml. acrylonitrile were mixed with 200 mg. mercuric bromide and introduced into a test-tube which was stoppered with a cork. A monomeric layer was established, as in Example 3. After maintaining the polymerizing mixture at a temperature of about 25° C. for a one month period, the initially precipitated white powdery substance was converted into a clear, transparent hard polymeric mass.

EXAMPLE 5

4.0 ml. of acrylonitrile were mixed with 500 mg. of aluminum nitrate, and introduced into an 8 ml. test-tube. A monomeric layer was established as in Example 3 and the polymerizing mixture was thus maintained at a temperature of about 25° C. for one month. The initially precipitated powdery, polymeric substance was transformed during such period into a yellowish, transparent hard material.

EXAMPLE 6

4.0 ml. acrylonitrile were mixed with 500 mg. chromic nitrate and introduced into an 8 ml. test-tube. A 1.5 mm. layer of monomeric acrylonitrile was established as in Example 3. After maintaining the mixture for 4 weeks at a temperature of about 25° C. the polymeric substance was cured to a partially transparent and partially opaque horny solid substance.

EXAMPLE 7

A quantity of 0.5 g. of powdery polyacrylonitrile was agitated with 300 mg. of mercuric nitrate and 4.0 ml. acrylonitrile in an 8 ml. test-tube. A monomeric layer was established as in Example 3. The test-tube was stoppered with a cork stopper and maintained for a one month period at a temperature of 25° C. The initial powdery material introduced into the test tube was converted to a transparent hard solid. In addition, the initially precipitated powdery polymer was also converted into a hard, transparent polymeric solid.

EXAMPLE 8

A quantity of 15 ml. of dimethyl formamide was saturated with mercuric nitrate; 3.0 ml. acrylonitrile were added and the solution was maintained at a temperature of 25° C. A viscous solution of the polymeric reaction product was obtained.

EXAMPLE 9

5.0 ml. acrylonitrile were mixed with 500 mg. mercuric nitrate and 50 mg. of Poly-Tergent G–300 (Poly-Tergent G–300 is a liquid, anhydrous, nonionic surface active agent. Chemically, it is an alkyl phenol polyglycol ether designed to possess good wetting, emulsifying or detergent properties and has ben marketed commercially under this Trademark since at least as early as 1957 by Olin-Mathieson Chem. Corp.). There was obtained a transparent, hard solid polymer; the conversion was considerably accelerated as a result of the addition of the surfactant.

EXAMPLE 10

A mixture of 1.0 ml. of acrylonitrile and 15 mg. benzoyl peroxide was introduced into a small test-tube and maintained at a temperature of 36° C. for two weeks. After the polymerization began a 1 mm. layer of monomeric acrylonitrile was placed above the polymerizing mass. The initially formed white powdery precipitate underwent a transformation to a rigid, hard and transparent yellowish polymeric material.

EXAMPLE 11

A mixture of 5.0 ml. of acrylonitrile and 60 mg. of p-toluene-sulfinic acid was introduced into a 50 ml. flask which was stoppered and maintained at a temperature of 24° C. After about 2 hours a monomeric surface layer was established and a white precipitate appeared which changed within a period of about 3 days into a transparent hard mass, covered with a thin layer of white powder at its upper surface.

EXAMPLE 12

In 20.0 ml. of acrylonitrile there were dissolved 150 mg. of p-toluene sulfinic acid and 150 mg. of p-toluene-sulfonic acid. The solution was introduced into a 100 ml. flask; this was stoppered and the temperature maintained at 24° C. A precipitate appeared after about 20 minutes and the flask was agitated in order to prevent the formation of large aggregates. The temperature of the reaction mixture increased to about 35° C., whereupon the flask was introduced into a 22° C. constant temperature bath. Thereupon monomeric surface layer was established, as in Example 3, but to a depth of 5 mm. After 14 hours a solid transparent mass was obtained, comprising about 95% of the total solids, the rest being a white powdery ring covering the upper surface of the transparent solid.

EXAMPLE 13

A mixture of 4 ml. acrylonitrile and 5 mg. azo-bis-isobutyronitrile was introduced into a stoppered test-tube; a 1.0 mm. acrylonitrile layer was established and the mixture then maintained at a temperature of 40° C. for 2 days. Most of the initially formed powdery precipitate underwent a change of state to a transparent, rigid and hard polymeric mass.

EXAMPLE 14

To 2.5 ml. of acrylonitrile there were added 20 mg. of p-toluene-sulfinic acid containing a trace of hydrochloric acid. The polymerizing mass was then covered with a monomeric surface layer and stoppered. The stoppered test-tube was exposed to diffuse day-light and maintained at a temperature of about 30° C. for 5 days. After this period a transparent, hard, solid polymer was obtained.

EXAMPLE 15

1.0 ml. acrylonitrile was mixed with 20 mg. p-toluene-sulfinic acid and 10 mg. of azo-bis-isobutyronitrile. The mixture was maintained at a temperature of 24° C. for 2 days. During this period, and after polymerization had begun, a layer of monomeric acrylonitrile was established 1 mm. thick. After this time one-third of the initially precipitated white powdery substance was converted into a transparent, hard, solid.

EXAMPLE 16

40.0 ml. acrylonitrile were mixed with 300 mg. p-toluene-sulfinic acid and 330 mg. p-toluene-sulfonic acid. The mixture was introduced into a 250 ml. flask and maintained with agitation for 1 hour at room temperature and then maintained without agitation for 10 days at a temperature of 4° C. After about 3 days most of the monomer was converted into a white, powdery polymer, whereupon a 10 mm. thick monomeric acrylonitrile layer was established and the mass then cured to a transparent, solid, and hard polymeric material.

EXAMPLE 17

3 ml. of a saturated solution of sodium chloride in acrylonitrile was mixed with 24 mg. p-toluene-sulfinic acid and the mixture introduced into a stoppered test-tube and maintained at 24° C. After 3 days a white polymer was formed, the surface layer established, and then, after an additional 5 days, the mass was transformed into a transparent, rigid and hard body.

EXAMPLE 18

To a mixture of 3 ml. acrylonitrile, 15 mg. p-toluene-sulfinic acid and 15 mg. p-toluene-sulfonic acid were added 60 mg. diethylphthalate, and the mixture maintained in a stoppered test-tube at room temperature. After partial curing to a white polymer, the monomeric surface layer was established and the tube was placed in a 22° C. constant temperature water bath. After 2 days all the white polymer which was initially formed had been transformed into a greenish, transparent solid body.

EXAMPLE 19

3 ml. acrylonitrile, 15 mg. p-toluene-sulfonic acid and 15 mg. p-toluene-sulfinic acid were introduced into a 25 ml. test-tube. 1 drop (about 18 mg.) 30% (by volume) hydrogen peroxide was added, air was removed by nitrogen bubbled through the solution and the tube closed with a rubber stopper. The tube was kept at room temperature (about 25° C.) until a layer of about 1 mm. acrylonitrile monomer remained above the precipitated white polymer. After this, the tube was maintained in a water bath of running tap water (22° C.) for 15–20 hours. A layer of transparent, colorless polymer was formed at the lower part of the bulk material. The test-tube was removed from the water bath and, after an additional 6 hours, the glassy polymer constituted about half of the volume of the reaction mixture.

EXAMPLE 20

4 ml. acrylonitrile, in which 40 mg. para-toluene-sulfinic acid were dissolved, was introduced into a 25 ml. test-tube. 1 drop 30% hydrogen peroxide was added, nitrogen was bubbled through the test tube and the tube was closed with a rubber stopper. The tube was left at room temperature for 20 hours. The greater part of the initially formed white polymer changed within this time period to a glassy, colorless mass.

EXAMPLE 21

A 20 ml. test-tube, containing a solution of 30 mg. para-toluene-sulfinic acid in 3 ml. acrylonitrile, and 1 drop hydrogen peroxide, was evacuated to 0.5 mm. Hg and sealed. After 1 hour at room temperature it was introduced into a water bath of running tap water (22° C.). Thereupon a monomeric acrylonitrile layer was established. After 15 hours nearly all the starting material was converted into a transparent, colorless solid polymer.

EXAMPLE 22

A solution of 30 ml. acrylonitrile, 300 mg. para-toluene-sulfinic acid and 8 drops (about 140 mg.) 30% hydrogen peroxide was introduced into a 125 ml. Erlenmeyer flask. After bubbling through nitrogen, the flask was closed with a rubber stopper. It was maintained without agitation at room temperature (23° C.) until only a small layer of monomer remained adjacent the upper surface of the polymerizing mixture. It was then introduced into a 4° C. water bath, the temperature of which was raised slowly and, when it reached 17° C., was maintained in the range of from 15° to 18° C. for 5 hours. Subsequently it was kept overnight in a water bath at 22° C. Nearly all the starting material was converted into a solid, rigid, transparent, colorless polymer; there remained a thin white polymeric layer at the edge of the transparent mass.

The rigid, solid, colorless, transparent polymerization products prepared according to Examples 19, 20 and 21 were machined so as to provide bodies having two plane surfaces, parallel with each other. The extinction coefficient $k$, defined by the formula:

$$\log \frac{I_0}{I} = (k)(l)$$

wherein $l$ is given in centimeters, was measured for a number of wavelengths. In each case the extinction coefficient $k$ determined had a value less than $k=0.417$ at 400 mu, $k=0.354$ at 455 mu, $k=0.329$ at 526 mu, $k=0.263$ at 625 mu and $k=0.219$ at 715 mu.

EXAMPLE 23

A mixture of about 20 ml. acrylonitrile and 1.6% by volume of 30% aqueous hydrogen peroxide was introduced into a 100 ml. test tube, which was stoppered and maintained at 22° C. in daylight. A layer of the clear acrylonitrile monomer was observed on the surface of the mixture throughout the period of cure. After a number of days a white powdery polymer was formed, and after about 14 days most of the monomeric mixture was converted into the desired transparent, rigid and colorless solid polymer.

EXAMPLE 24

A mixture of 40 ml. of acrylonitrile, 28 mg. azo-bis-isobutyronitrile and 0.6% by volume of 30% aqueous hydrogen peroxide was introduced into a 100 ml. test tube, which was stoppered and maintained at 30° C. A layer of the clear acrylonitrile monomer was observed on the surface of the mixture throughout the period of cure. After 8 days the initially formed white powder was transformed into a colorless, rigid and transparent polymer.

EXAMPLE 25

A solution containing 40 mg. p-toluene-sulfinic acid, 20 mg. of 30% (by volume) aqueous hydrogen peroxide and 12 mg. of β-isopropylaminopropionitrile in 4 ml. acrylonitrile was prepared and incubated at 20° C. Throughout the period of reaction a surface layer of liquid acrylonitrile monomer was maintained by the periodic addition of acrylonitrile monomer. After about 3 days a transparent and colorless mass was obtained which, after being maintained for a three month period in sunlight, did not undergo any yellowing or other change of color.

EXAMPLE 26

Polyacrylonitrile samples were prepared by polymerizing a mixture of p-toluene-sulfinic acid (10 mg./ml. acrylonitrile), 30% (by volume) hydrogen peroxide (5 mg./ml. acrylonitrile), and a β-dimethylaminopropionitrile color stabilizer (0.2% by weight of the acrylonitrile). After curing in the manner described in Example 25, the polymerized mass was transformed into a transparent, colorless body.

Samples of the transparent polymer were placed outdoors exposed to sunlight, and observed every two days for yellowing by comparison with a water-white sample. After two weeks the samples yellowed.

Further samples of the product produced as described above were stored in the laboratory under normal conditions and exposed to scattered sunlight during the daylight hours and fluorescent light during the evening hours. The test samples prepared as described above yellowed after a four week period.

EXAMPLE 27

Polyacrylonitrile samples prepared as described in Example 26, but containing 0.25% β-isopropylaminopropionitrile in place of the β-dimethylaminopropionitrile color stabilizer of such example, were placed outdoors, exposed to sunlight, and observed every two days for yellowing by comparison with a water white sample. After 3 months the samples yellowed.

Further samples of the product were stored in the laboratory under normal conditions and exposed to scattered sunlight during the daylight hours and fluorescent light during the evening hours. The test samples did not turn yellow after five months' exposure.

EXAMPLE 28

Polyacrylonitrile samples prepared as described in Example 26, but containing 0.30% β-isopropylaminopropionitrile, were placed outdoors and exposed to sunlight, and observed every two days for yellowing by comparison with a water-white sample. No yellowing occurred after a three months period.

Further samples of the product were stored in the laboratory under normal conditions and exposed to scattered sunlight during the daylight hours and fluorescent light during the evening hours. The test samples did not turn yellow after five months' exposure.

EXAMPLE 29

Test samples were prepared in the manner described in Example 25 from acrylonitrile monomer polymerized in stoppered test tubes in the presence of 10 mg./ml. p-toluene sulfinic acid and 5 mg./ml. 30% hydrogen peroxide. The samples were prepared with the addition of one of the following color stabilizers:

| Sample | Stabilizer | Amount of Stabilizer, Percent |
|---|---|---|
| A-1 | β-Dimethylaminopropionitrile | 0.25 |
| A-2 | ----do---- | 0.30 |
| A-3 | ----do---- | 0.35 |
| B-1 | β-Isopropylaminopropionitrile | 0.25 |
| B-2 | ----do---- | 0.30 |
| B-3 | ----do---- | 0.35 |
| C-1 | n-Tributylamine | 0.25 |
| C-2 | ----do---- | 0.30 |
| C-3 | ----do---- | 0.35 |
| D-1 | None | None |

Samples A-2 and A-3 were partially opaque and were discarded. The remaining samples were exposed to ultraviolet light at a distance of 20 cm. from a 100 watt Hanovia mercury arc lamp. As compared with sample D-1, the test samples were stabilized against discoloration in the following order: B-3, A-1, B-2, B-1, C-3, C-2 and C-1.

EXAMPLE 30

A casting cell was prepared by clamping a ¼" polyvinyl chloride gasket between two 10" by 14" glass plates. The plates had been wiped clean with chloroform before use. 100 parts of acrylonitrile, deaerated with argon for 2½ hours, was cooled to 18° C. whereupon 1 part of p-toluene-sulfinic acid and 0.5 part of 30% aqueous solution of hydrogen peroxide were added to the deaerated monomer. After solution was effected, the catalyzed monomer was poured into the casting cell, filling it approximately ⅔ full.

The free space above the monomer was then flushed briefly with argon, the gasket closed and the cell placed in a water bath at 19° C. Polymerization began to take place in the lower part of the cell but did not occur in the upper or boundary layer of monomer due to the slow diffusion of air into the cell at the gasket closure above such layer. After 1½ hours, an additional 20 parts of the deaerated acrylonitrile monomer were added. After 3½ hours, a second addition of 50 parts of deaerated monomeric acrylonitrile was made. After 44 hours, a third addition of 20 parts of deaerated monomeric acrylonitrile was made. After 68 hours, the casting process was completed by heating the assembly in a water bath at 23° C. for 73 hours. The development of a hard solid transparent polymer was evident in the center portion of the casting after 44 hours. The sample displayed clarity from the center outwardly toward the gasket. The final product had a clear, transparent, water-white appearance surrounded by an opaque band.

EXAMPLE 31

Sheets of the transparent acrylonitrile polymer were produced, utilizing molds constructed from pairs of aluminum plates 30 x 40 x 0.5 cm., each of which plates was coated on its inner side with a Teflon film .003 inch thick. Polyethylene frames, either 2 or 4 mm. thick, were utilized as spacers between the aluminum plates. The plates were maintained in parallel relation by means of ⅛ inch screws spaced 2 cm. apart along the edges of the plates. Two polyethylene tubes were disposed at the top of each mold thus defined to facilitate filling the mold and subsequently adding monomer solution during the casting operation.

Acrylonitrile monomer admixed with 10 mg./ml. of p-toluene-sulfinic acid, 5 mg./ml. of 30% hydrogen peroxide and 2 mg./ml. β-isopropylaminopropionitrile was employed as the casting mixture.

Each mold was placed in a vertical position in a constant temperature water bath and substantially filled with the mixture. An upper air space was provided to prevent blocking of the polyethylene tube inlets. After about 30 minutes precipitated acrylonitrile polymer was formed throughout the volume of the reaction mixture; additional monomer was then added, without stirring, through one of the polyethylene tubes until the monomer level rose in the other tube. Monomer was periodically added throughout the subsequent polymerization to maintain the tubes filled to a height of about 15 cm., the bath temperature being maintained at 20° C. for the first day, and then at a temperature of from 22° C. to 24° C. for an additional five to seven days.

One week after initiating the polymerization the molds were disassembled, revealing acrylonitrile polymer sheets, each of which was transparent over approximately 60% of its area and opaque white over the remaining 40% of its area.

EXAMPLE 32

*Acrylonitrile-methyl methacrylate copolymer*

Into a suitable reaction vessel there were introduced 95 parts of acrylonitrile and 5 parts of methyl methacrylate to which had been added 1.0 part of p-toluene-sulfinic acid and 0.5 part of 30% aqueous solution of hydrogen peroxide. The charge was held at about 23° C. under a blanket of nitrogen. After 90 min. a 15 part addition of the same mixture of co-monomers was added. After 18 hours a 35 part addition of the same co-monomers was added. After 2 days the initially formed white powdery cake was transformed in the bottom half of the reaction vessel to a hard, colorless, transparent copolymer.

EXAMPLE 33

*Acrylonitrile-methyl methacrylate copolymer*

Acrylonitrile monomer was copolymerized with methyl methacrylate in the presence of 1% p-toluene sulfinic acid and 0.5% hydrogen peroxide, the percentages based on the total monomer content, at 30° C. in 1 cm. internal diameter Pyrex test tubes. The proportions of methyl methacrylate monomer in the initial mixtures utilized to produce three separate sets of polymer samples were established at 5%, 10% and 20% by volume thereof.

After two days curing at the 30° C. temperature, the lower half of each polymeric mass produced from the mixtures containing 5% methyl methacrylate was translucent, the lower ¾ of each mass produced from the mixtures containing 10% methyl methacrylate was transparent, and the entire volume of each mass produced from the mixtures containing 20% methyl methacrylate was transparent.

After a one week cure the 5% methyl methacrylate samples were 80% translucent and the 10% and 20% methyl methacrylate samples were completely transparent; all of the samples were colorless. The density of each of such products was found to be 1.16, closely approximating the 1.17 and 1.18 densities of the homopolymers of acrylonitrile and methyl methacrylate, respectively.

EXAMPLE 34

*Acrylonitrile-styrene copolymer*

Into a suitable reaction vessel there were introduced 15 parts of a mixture of 99% of acrylonitrile and 1% of styrene catalyzed with 1% part of p-toluene-sulfinic acid and 5% of a 30% aqueous solution of hydrogen peroxide. The charge was heated at 26° C. under a nitrogen atmosphere. After 3 hours, two more parts of the monomer mixture were added and after 5 hours, five more parts of the monomer mixture were added, so as to provide a surface layer of monomer. After 2 days the lower half of the polymerizing mass was transformed into a hard, colorless, transparent solid.

EXAMPLE 35

*Acrylonitrile-styrene copolymer*

Acrylonitrile monomer was copolymerized with styrene in the presence of 1% p-toluene-sulfinic acid and 0.5% hydrogen peroxide at 30° C. in 1 cm. test tubes. The amounts of styrene in the initial monomer mixtures of the several samples utilized were 5%, 10% and 20% by volume. One set of samples was prepared from acrylonitrile-styrene mixtures containing 0.08% β-isopropylaminopropionitrile and a second set of samples was prepared from the corresponding mixtures absent the propionitrile color stabilizer.

After an induction period of about 12 hours white opaque polymer products were obtained from the monomer mixtures containing 0% and 5% of the styrene comonomer, and translucent polymer masses were obtained from the monomer mixtures containing 10% and 20% of the styrene comonomer.

After two days the products prepared from the 5% styrene mixtures possessed a few transparent regions, whereas the other samples were still translucent.

After 10 days the products produced from mixtures not containing the β-isopropylaminopropionitrile stabilizer were still translucent and slightly yellow, whereas the samples containing the 0.8% of such stabilizer were also semi-transparent but were colorless.

EXAMPLE 36

*Acrylonitrile-styrene copolymer*

A mixture of 200 mg. mercuric nitrate, 0.5 ml. styrene and 3.5 ml. acrylonitrile was prepared, introduced into a test-tube, a monomeric layer established as in Example 3, and the resulting mixture maintained at a temperature of 35° C. for 3 days. A transparent solid polymer of yellowish color was obtained, comprising about 70% of the starting material.

EXAMPLE 37

*Acrylonitrile-ethyl acrylate copolymer*

Into a suitable reaction vessel there were introduced 15 parts of a 5% solution of ethyl acrylate in acrylonitrile catalyzed with 0.5 part of p-toluene-sulfinic acid and 0.25 part of a 30% aqueous solution of hydrogen peroxide. The charge was heated at 26° C. under an atmosphere of nitrogen. After 1 hour, 2 parts of the monomer mixture were added and after 5 hours, 5 parts of the monomer mixture were added so as to provide a monomeric surface layer above the polymerizing mass. After 2 days the lower portion of the polymerized mass was transformed into a hard, colorless, transparent solid leaving a thin layer of a white opaque cake at the barrier layer.

EXAMPLE 38

*Acrylonitrile-maleic anhydride copolymer*

Into a suitable reaction vessel there were introduced 15 parts of a 1% solution of maleic anhydride in acrylonitrile. The charge was catalyzed with a mixture of 0.5 part of p-toluene-sulfinic acid and 0.25 part of a 30% aqueous solution of hydrogen peroxide. As before, the charge was heated at 26° C. in an atmosphere of nitrogen. After 1 hour, 2 parts of the monomer mixture were added and after 4 hours, 5 parts of the monomer mixture were added so as to maintain a monomeric surface layer. After three days the lower part of the polymerizing mass was transformed into a hard, colorless, transparent solid.

EXAMPLE 39

*Acrylonitrile-allyl methacrylate copolymer*

Into a suitable reaction vessel there were introduced 15 parts of a 3% solution of allyl methacrylate in acrylonitrile. The charge was catalyzed with 0.5 part of p-toluene-sulfinic acid and 0.25 part of a 30% aqueous solution of hydrogen peroxide. The charge was heated at 26° C. under an atmosphere of nitrogen. After 1 hour, 2 parts of the same monomer solution were added and after 4 hours, 5 parts of the same monomer solution were added so as to provide the monomeric layer separating the polymerizing mass from the surrounding atmosphere. After 3 days the initially formed chalky white cake was transformed into a hard, colorless, transparent solid.

EXAMPLE 40

*Acrylonitrile-acrylamide copolymer*

Into a suitable reaction vessel there were introduced 15 parts of a 1% solution of acrylamide in acrylonitrile. The polymerizable mass was then catalyzed with 0.5 part of p-toluene-sulfinic acid and 0.25 part of a 30% aqueous solution of hydrogen peroxide. The charge was heated at 26° C. under an atmosphere of nitrogen. After 1 hour, 2 parts of the same monomer solution were added and after 5 hours, 5 parts of the same monomer solution were added so as to provide a monomeric surface layer. After 7 days at 26° C. the initially formed chalky white cake was transformed into a hard colorless, transparent solid.

EXAMPLE 41

*Acrylonitrile-vinylidine chloride copolymer*

Into a suitable reaction vessel there was introduced 15 parts of a mixture of 95 parts of acrylonitrile and 5 parts of vinylidine chloride. The monomer mixture was catalyzed by the addition of 0.5 part of p-toluene-sulfinic acid and 0.25 part of 30% aqueous solution of hydrogen peroxide. The charge was then heated at 26° C. under an atmosphere of nitrogen. At periods of 1 hour, 2 hours, and 4 hours after the initial heating began there were added to the surface of the polymerizing mass 2 parts, 2 parts and 5 parts, respectively, of the same monomer mixture. Four days later the initially formed white, chalky cake was transformed into a hard colorless, transparent solid.

EXAMPLE 42

*Acrylonitrile-ethyl acrylate copolymer*

Into a suitable reaction vessel there were introduced 15 parts of a mixture of 95 parts of acrylonitrile, 5 parts of ethyl acrylate and 0.1 part of ethylene glycol dimethacrylate as a cross-linking agent. The monomer mixture was then catalyzed with 0.5% of p-toluene-sulfinic acid and 0.25 part of a 30% aqueous solution of hydrogen peroxide. The total charge was then heated at 26° C. under an atmosphere of nitrogen. After 1 hour from the initial heating period, 2 parts of the same monomer mixture were added followed by 5 additional parts 2 hours later. In 4 days, the initially formed opaque cake was transformed into a hard, colorless, transparent solid with a white powdery polymeric material on its outer edge.

EXAMPLE 43

*Acrylonitrile-divinyl benzene copolymer*

Thirty mg. of p-toluene-sulfinic acid were dissolved in 3 ml. of acrylonitrile monomer. To various test tubes filled with this mixture divinyl benzene was added in amounts such that the concentration of divinyl benzene in the monomer mixture ranged from 0.5 to 1.5% by weight of the total monomer.

Transparent greenish acrylonitrile-divinyl benzene copolymer was obtained after polymerizing the mixture at room temperature for a three-day period, while maintaining a surface layer of the co-monomer mixture adjacent the upper surface of each test tube throughout the curing period.

EXAMPLE 44

*Acrylonitrile-methacrylonitrile copolymer*

Acrylonitrile was copolymerized at 30° C. with methacrylonitrile in the presence of 1% p-toluene-sulfinic acid and 0.5% hydrogen peroxide in 5 mm. I.D. Pyrex tubes. The initial monomer mixtures employed contained 0%, 5%, 10%, 15% and 20% methacrylonitrile by volume.

In each case a white cloudy polymer was immediately obtained and slowly transformed into a transparent solid. Transparency appeared throughout 40% to 60% of the volume of each polymeric mass obtained from the 5% methacrylonitrile monomer mixture after 15 hours; throughout 50% to 70% of the volume of each such mass produced from the 10% methacrylonitrile monomer mixture after 60 hours; throughout 20% to 40% of the volume of each such mass produced from the 15% methacrylonitrile monomer mixture after 130 hours; and throughout 20% to 30% of the volume of each polymer mass produced from the 20% methacrylonitrile monomer mixture after 155 hours.

The copolymer produced from the 5% methacrylonitrile monomeric mixture was the most transparent and was almost colorless, whereas the other samples possessed white opaque traces in the transparent bodies and were slightly yellow.

EXAMPLE 45

*Acrylonitrile-methacrylonitrile copolymer*

Acrylonitrile was copolymerized with methacrylonitrile in the presence of 1% p-toluene-sulfinic acid and 0.5% hydrogen peroxide under the same conditions employed in Example 44. Two sets of monomer mixtures were utilized, the first including 2.5% methacrylonitrile and the second including 5% methacrylonitrile. β-Isopropylaminopropionitrile was incorporated in each monomeric mixture in a concentration of 0.25% based on the total monomer weight. The resulting products did not discolor when subjected to light for prolonged periods.

EXAMPLE 46

*Acrylonitrile-methacrylonitrile copolymer*

A mixture of 97.5% by volume of acrylonitrile and 2.5% by volume of methacrylonitrile was mixed with 1% by volume of p-toluene sulfinic acid, 0.5% of 30% aqueous hydrogen peroxide and 0.25% of β-isopropylaminopropionitrile. After permitting the mixture to polymerize for 15 hours at 30° C., while maintaining a surface layer containing the monomeric mixture thereon, a transparent polymeric mass was produced.

Since certain changes may be made in carrying out the above method and in the resulting composition without departing from the scope of the invention, it is intended that all matter contained in the above description shall be interpreted as illustrative and not in a limiting sense.

We claim:

1. A process for polmerizing acrylonitrile in bulk in the presence of an acrylonitrile polymerization initiator, which comprises mechanically agitating a mixture of acrylonitrile monomer with said polymerization initiator to distribute the initiator in the liquid monomer; terminating the agitation of the reaction mixture at least at the beginning of solidification of said mixture; and thereafter maintaining the reaction mixture free from mechanical agitation while simultaneously providing a surface layer at the interface between the polymerizing mass and the surrounding atmosphere by adding acrylonitrile monomer during the polymerization reaction, said layer containing monomeric acrylonitrile in an amount sufficient to enter into the polymerization mass to prevent the development of voids therein, to thereby polymerize the acrylonitrile monomer into a solid, transparent polymeric mass.

2. The process as defined in claim 1, in which said polymerization initiator is utilized in an amount of from 0.1% to 5% by weight, based on the total weight of monomer polymerized, and is selected from the group consisting of mixtures of p-toluene-sulfinic acid and p-toluene-sulfonic acid; mixtures of p-toluene-sulfinic acid and azo-bis-isobutyronitrile; mixtures of p-toluene-sulfinic acid and hydrogen peroxide; mixtures of p-toluene-sulfinic acid, p-toluene-sulfonic acid and hydrogen peroxide; mixtures of benzene sulfinic acid and hydrogen peroxide; and mixtures of azo-bis-isobutyronitrile and hydrogen peroxide.

3. The process as defined in claim 1, in which said polymerization initiator is selected from the group consisting of (A) a metal salt catalyst selected from the group consisting of mercuric bromide, mercuric chloride, mercuric iodide, mercuric nitrate, mercuric acetate, mercuric sulfate, mercuric bromate, mercurous nitrate, mercurous acetate, mercurous sulfate, cupric nitrate, aluminum nitrate, cadmium nitrate, nickelous nitrate, magnesium nitrate, chromic nitrate, ferrous perchlorate, calcium perchlorate and uranyl nitrate in an amount of from 1% to 20% by weight of said monomeric material; and (B) a mixture of from 1% to 5% of said metal salt catalyst and from 0.1% to 5% of a polymerization initiator selected from the group consisting of mixtures of p-toluene-sulfinic acid and p-toluene sulfonic acid; mixtures of p-toluene-sulfinic acid and azo-bis-isobutyronitrile; mixtures of p-toluene-sulfinic acid and hydrogen peroxide; mixtures of p-toluene-sulfinic acid, p-toluene-sulfonic acid and hydrogen peroxide; mixtures of benzene sulfinic acid and hydrogen peroxide; and mixtures of azo-bis-isobutyronitrile and hydrogen peroxide, said percentages based on the weight of said monomeric material.

4. The process as defined in claim 1, in which a color stabilizer selected from the group consisting of β-dimethylaminopropionitrile and β-isopropylaminopropionitrile is admixed with the monomeric material in an amount of from 0.1% to 0.3% by weight of said monomeric material.

5. The process as defined in claim 1, wherein said reaction mixture incorporates up to 15%, by weight of said mixture, of at least one polymerizable comonomer containing a $CH_2{=}C{<}$ group, and wherein the polymerization is carried out at temperatures in the range of from 0° to 60° C.

6. A process for polymerizing acrylonitrile in bulk in the presence of an acrylonitrile polymerization initiator, which comprises mechanically agitating a mixture of acrylonitrile monomer with said polymerization initiator to distribute the initiator in the liquid monomer; terminating the agitation of the reaction mixture at least at the beginning of solidification of said mixture; and thereafter maintaining the reaction mixture free from mechanical agitation while simultaneously providing a surface layer at the interface between the polymerizing mass and the surrounding atmosphere by establishing a temperature gradient between the strata of the polymerization reaction mixture, said layer containing monomeric acrylonitrile in an amount sufficient to enter into the polymerization mass to prevent the development of voids therein, to thereby polymerize the acrylonitrile monomer into a solid, transparent polymeric mass.

7. The process as defined in claim 6, wherein said reaction mixture incorporates up to 15%, by weight of said mixture, of at least one polymerizable comonomer containing a $CH_2{=}C{<}$ group, and wherein the polymerization is carried out at temperatures in the range of from 0° to 60° C.

8. The process as defined in claim 6, in which said polymerization initiator is utilized in an amount of from 0.1% to 5% by weight, based on the total weight of monomer polymerized, and is selected from the group consisting of mixtures of p-toluene-sulfinic acid and p-toluene-sulfonic acid; mixtures of p-toluene-sulfinic acid and azo-bis-isobutyronitrile; mixtures of p-toluene-sulfinic acid and hydrogen peroxide; mixtures of p-toluene-sulfinic acid, p-toluene-sulfonic acid and hydrogen peroxide; mixtures of benzene sulfinic acid and hydrogen peroxide; and mixtures of azo-bis-isobutyronitrile and hydrogen peroxide.

9. The process as defined in claim 6, in which said polymerization initiator is selected from the group consisting of (A) a metal salt catalyst selected from the group consisting of mercuric bromide, mercuric chloride, mercuric iodide, mercuric nitrate, mercuric acetate, mercuric sulfate, mercuric bromate, mercurous nitrate, mercurous acetate, mercurous sulfate, cupric nitrate, aluminum nitrate, cadmium nitrate, nickelous nitrate, magnesium nitrate, chromic nitrate, ferrous perchlorate, calcium perchlorate, and uranyl nitrate in an amount of from 1% to 20% by weight of said monomeric material; and (B) a mixture of from 1% to 5% of said metal salt catalyst and from 0.1% to 5% of a polymerization initiator selected from the group consisting of mixtures of p-toluene-sulfinic acid and p-toluene-sulfonic acid; mixtures of p-toluene sulfinic acid and azo-bis-isobutyronitrile; mixtures of p-toluene sulfinic acid and hydrogen peroxide; mixtures of p-toluene-sulfinic acid, p-toluene-sulfonic acid and hydrogen peroxide; mixtures of benzene sulfinic acid and hydrogen peroxide; and mixtures of azo-bis-isobutyronitrile and hydrogen peroxide; said percentages based on the weight of said monomeric material.

10. The process as defined in claim 6, in which a color stabilizer selected from the group consisting of β-dimethylaminopropionitrile and β-isopropylaminopropionitrile is admixed with the monomeric material in an amount of from 0.1% to 0.3% by weight of said monomeric material.

References Cited

UNITED STATES PATENTS

| | | | |
|---|---|---|---|
| 2,432,511 | 12/1947 | Davis et al. | 260—465.9 |
| 2,519,135 | 8/1950 | Jacobson et al. | 260—88.7 |
| 2,963,457 | 12/1960 | Miller | 260—88.7 |

OTHER REFERENCES

Roskin: Chem. Abs., 51 (1957), p. 18692h.

Schildknecht: Vinyl and Related Polymers, John Wiley & Sons, Inc., New York (1959), p. 264 (copy in Group 140).

JOSEPH L. SCHOFER, *Primary Examiner.*

H. WONG, *Assistant Examiner.*